(12) United States Patent
Chen et al.

(10) Patent No.: US 8,342,410 B2
(45) Date of Patent: Jan. 1, 2013

(54) METHOD AND APPARATUS FOR INCREASING BRIGHTNESS OF AIMING PATTERN IN IMAGING SCANNER

(75) Inventors: Caihua (Lucy) Chen, Hauppauge, NY (US); Yuly Mitelman, Stony Brook, NY (US); Igor Vinogradov, Oakdale, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 165 days.

(21) Appl. No.: 12/787,005

(22) Filed: May 25, 2010

(65) Prior Publication Data

US 2011/0290885 A1  Dec. 1, 2011

(51) Int. Cl.
*G06K 7/10* (2006.01)
(52) U.S. Cl. ............ 235/462.43; 235/454; 235/462.01; 235/462.2; 235/462.21
(58) Field of Classification Search .............. 235/435, 235/454, 462.01, 462.2, 462.21, 462.41, 235/462.43
See application file for complete search history.

(56) References Cited

U.S. PATENT DOCUMENTS

| | | | |
|---|---|---|---|
| 4,794,239 A | 12/1988 | Allais | |
| 5,304,786 A | 4/1994 | Pavlidis | |
| 6,340,114 B1 * | 1/2002 | Correa et al. | 235/462.22 |
| 6,889,904 B2 * | 5/2005 | Bianculli et al. | 235/462.22 |
| 6,976,629 B2 * | 12/2005 | Carlson | 235/462.11 |
| 2004/0031851 A1 * | 2/2004 | Bianculli et al. | 235/462.41 |
| 2004/0032527 A1 * | 2/2004 | Carlson | 348/372 |
| 2004/0159703 A1 * | 8/2004 | Kogan et al. | 235/454 |
| 2009/0236426 A1 * | 9/2009 | Barkan et al. | 235/472.01 |

* cited by examiner

*Primary Examiner* — Michael G Lee
*Assistant Examiner* — Paultep Savusdiphol
(74) *Attorney, Agent, or Firm* — Nong-Qiang Fan

(57) ABSTRACT

A method and apparatus for using in a barcode reader. The apparatus includes an aiming lens assembly including an irregular-shape lens, an aiming light source positioned behind the aiming lens assembly, and an aperture with the desired aiming pattern shape placed in close proximity to the aiming source for generating a visible aiming light pattern towards the target object. The irregular-shape lens includes at least a recess for accommodating the imaging lens when the irregular-shaped lens is assembled into the apparatus with other components.

20 Claims, 5 Drawing Sheets

METHOD AND APPARATUS FOR INCREASING BRIGHTNESS OF AIMING PATTERN IN IMAGING SCANNER

FIELD OF THE DISCLOSURE

The present disclosure relates generally to imaging-based barcode scanners.

BACKGROUND

Various electro-optical systems have been developed for reading optical indicia, such as barcodes. A barcode is a coded pattern of graphical indicia comprised of a series of bars and spaces of varying widths. In a barcode, the bars and spaces having differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417, which are respectively described in U.S. Pat. No. 4,794,239 and U.S. Pat. No. 5,304,786.

Systems that use one or more solid-state imagers for reading and decoding barcodes are typically referred to as imaging-based barcode readers, imaging scanners, or imaging readers. A solid-state imager generally includes a plurality of photosensitive elements or pixels aligned in one or more arrays. Examples of solid-state imagers include charged coupled devices (CCD) or complementary metal oxide semiconductor (CMOS) imaging chips.

In some implementations, some of the basic components of an imaging scanner are packed together to form a barcode scan-engine. The barcode scan-engines can be installed into other devices and apparatus to form fully-functional imaging scanners in the form of workstations or hand-held devices. Barcode scan engines can also be integrated into mobile phones, mobile computer and other portable devices to add barcode reading functions to these devices. These mobile devices may require pico-size barcode scan engines that can also be cost effectively manufactured. In these barcode scan engines, even through some of the basic components of an imaging scanner have to be packed into some limited space, it is still desirable to have an aiming system in a barcode reading engine that can generate bright aiming patterns.

SUMMARY

In one aspect, the invention is directed to an apparatus for using in a barcode reader. The apparatus includes an illumination source for providing illumination directed toward a target object, an imaging lens assembly including an imaging lens, and a solid-state imager having an array of photosensitive elements positioned behind the imaging lens assembly for capturing an image from the target object. The apparatus also includes an aiming lens assembly including an irregular-shape lens, and an aiming light source positioned behind the aiming lens assembly for generating a visible aiming light pattern towards the target object. The irregular-shape lens includes a recess for accommodating the imaging lens when the irregular-shaped lens and the imaging lens are both assembled into the apparatus.

Implementations of the invention can include one or more of the following advantages. The brightness of the visible aiming light pattern can be significantly increased without increasing the size of the barcode scan engine. These and other advantages of the present invention will become apparent to those skilled in the art upon a reading of the following specification of the invention and a study of the several figures of the drawings.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
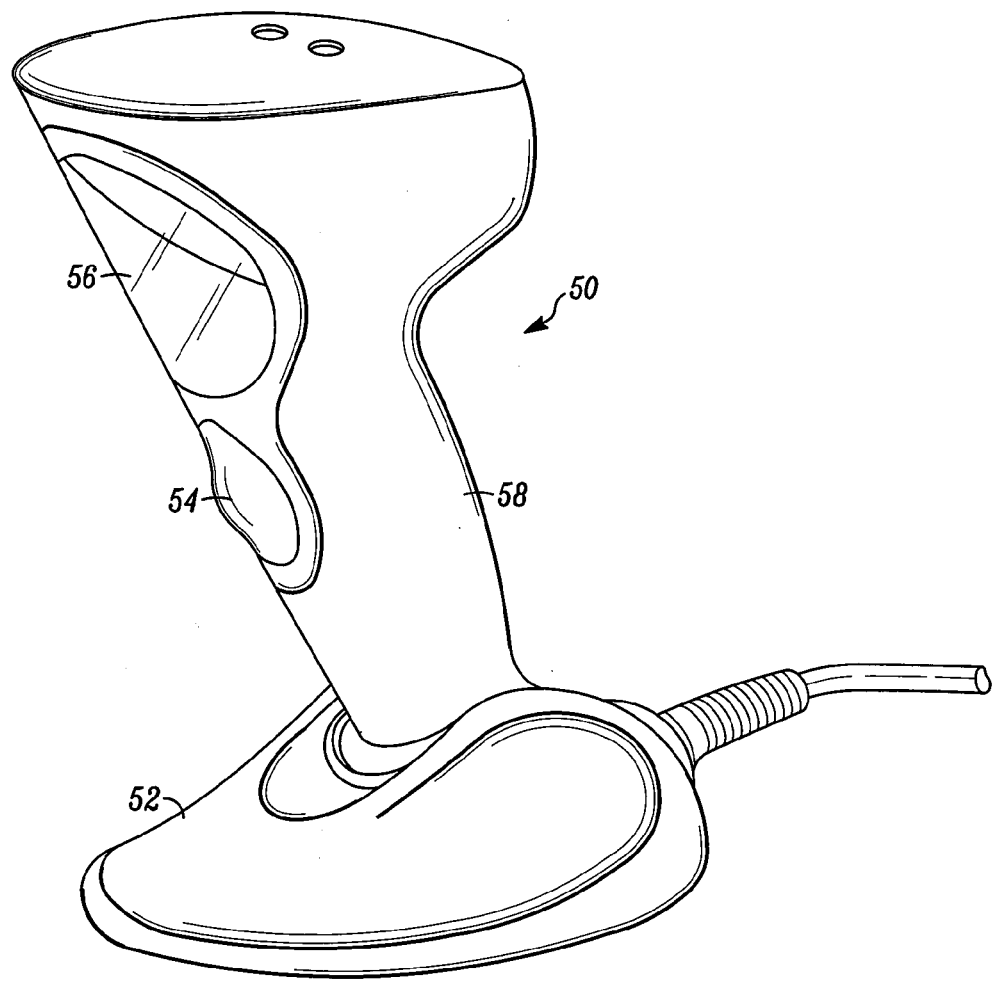
FIG. 1 shows an imaging scanner in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 shows an imaging scanner 50 in accordance with some embodiments. The imaging scanner 50 has a window 56 and a housing 58 with a handle. The imaging scanner 50 also has a base 52 for supporting itself on a countertop. The imaging scanner 50 can be used in a hands-free mode as a stationary workstation when it is placed on the countertop. The imaging scanner 50 can also be used in a handheld mode when it is picked up off the countertop and held in an operator's hand. In the hands-free mode, products can be slid, swiped past, or presented to the window 56. In the handheld mode, the imaging scanner 50 can be moved towards a barcode on a product, and a trigger 54 can be manually depressed to initiate imaging of the barcode. In some implementations, the base 52 can be omitted, and the housing 58 can also be in other shapes. In FIG. 1, a cable is also connected to the base 52. In other implementations, when the cable connected to the base 52 is omitted, the imaging scanner 50 can be powered by an on-board battery and it can communicate with a remote host by a wireless link.

Figure 2:
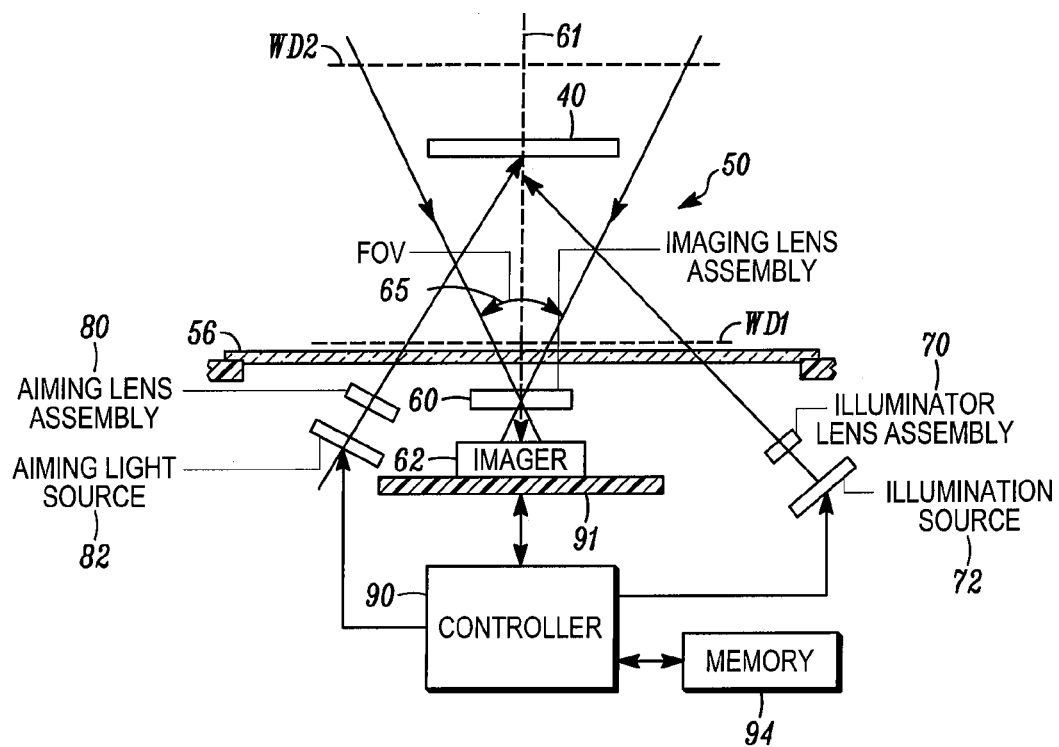
FIG. 2 is a schematic of an imaging scanner in accordance with some embodiments.

FIG. 2 is a schematic of an imaging scanner 50 in accordance with some embodiments. The imaging scanner 50 in FIG. 2 includes the following components: (1) a solid-state imager 62 positioned behind an imaging lens assembly 60;

(2) an illuminating lens assembly 70 positioned in front of an illumination source 72; (3) an aiming lens assembly 80 positioned in front of an aiming light source 82; and (4) a controller 90. In FIG. 2, the imaging lens assembly 60, the illuminating lens assembly 70, and the aiming lens assembly 80 are positioned behind the window 56. The solid-state imager 62 is mounted on a printed circuit board 91 in the imaging scanner.

The solid-state imager 62 can be a CCD or a CMOS imaging device. The solid-state imager 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The solid-state imager 62 is operative to detect light captured by an imaging lens assembly 60 along an optical path or axis 61 through the window 56. Generally, the solid-state imager 62 and the imaging lens assembly 60 are designed to operate together for capturing light scattered or reflected from a barcode 40 as pixel data over a two-dimensional field of view (FOV) 65.

The barcode 40 generally can be located anywhere in a working range of distances between a close-in working distance (WD1) and a far-out working distance (WD2). In one specific implementation, WD1 is about a few inches from the window 56, and WD2 is about a few feet from the window 56. Some of the imaging scanners can include a range finding system for measuring the distance between the barcode 40 and the imaging lens assembly 60. Some of the imaging scanners can include an auto-focus system to enable a barcode be more clearly imaged with the solid-state imager 62 based on the measured distance of this barcode. In some implementations of the auto-focus system, the focus length of the imaging lens assembly 60 is adjusted based on the measured distance of the barcode. In some other implementations of the auto-focus system, the distance between the imaging lens assembly 60 and the solid-state imager 62 is adjusted based on the measured distance of the barcode.

In FIG. 2, the illuminating lens assembly 70 and the illumination source 72 are designed to operate together for generating an illuminating light towards the barcode 40 during an illumination time period. The illumination source 72 can include one or more light emitting diodes (LED). The illumination source 72 can also include a laser or other kind of light sources. The aiming lens assembly 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser or other kind of light sources. In some embodiments, there is an aperture (not shown in the figure) located between the aiming lens assembly 80 and the LED to form the shape of the aiming spot. Usually the aperture is located in a close proximity to the LED. The aperture can have a circular, rectangular, cross, or any other shape of the opening to form a desired spot.

In FIG. 2, the controller 90, such as a microprocessor, is operatively connected to the solid-state imager 62, the illumination source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the field of view (FOV) of the imaging scanner 50. In some implementations, the barcode 40 can be decoded by digitally processing a captured image of the barcode with a microprocessor.

In operation, in accordance with some embodiments, the controller 90 sends a command signal to energize the illumination source 72 for a predetermined illumination time period. The controller 90 then exposes the solid-state imager 62 to capture an image of the barcode 40. The captured image of the barcode 40 is transferred to the controller 90 as pixel data. Such pixel data is digitally processed by the decoder in the controller 90 to decode the barcode. The information obtained from decoding the barcode 40 is then stored in the memory 94 or sent to other devices for further processing.

Figure 3:
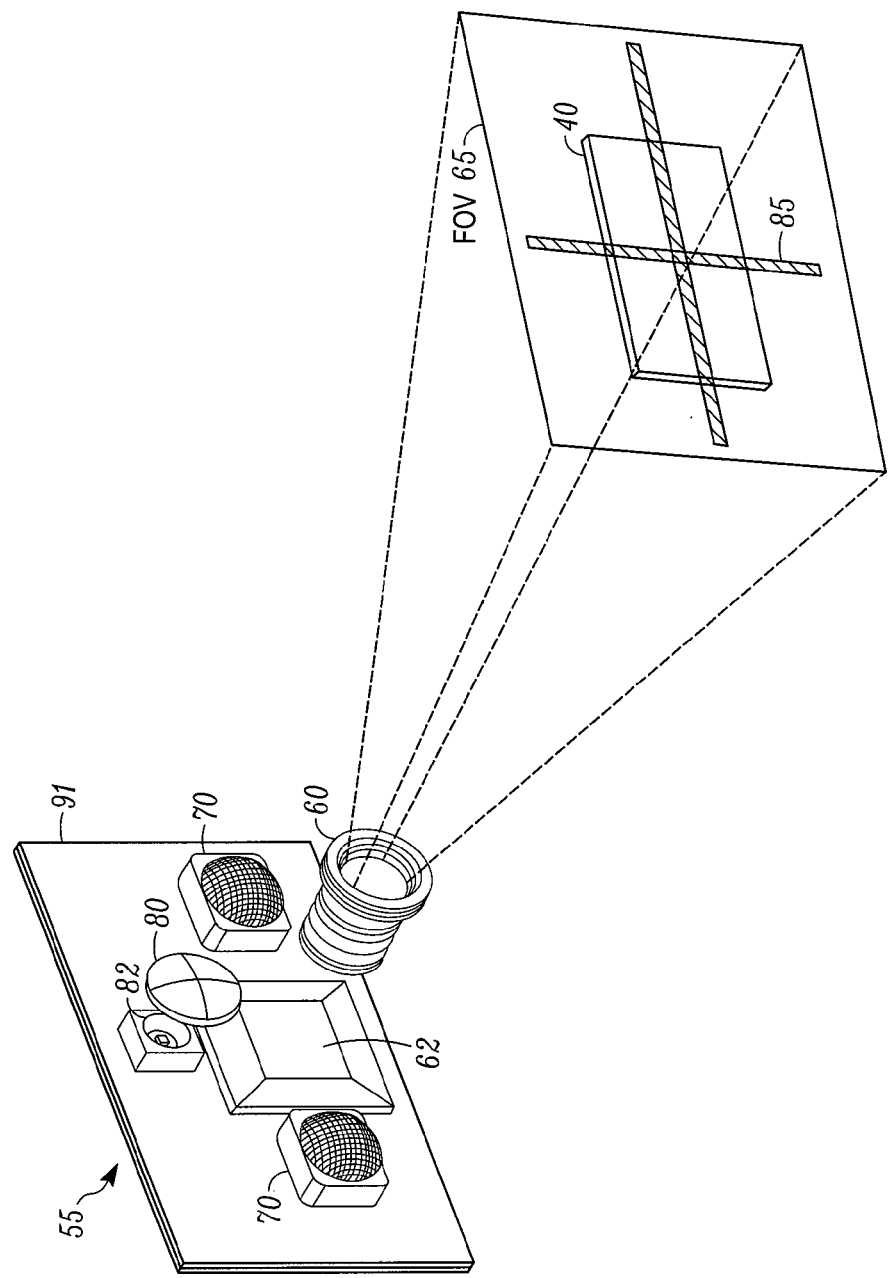
FIG. 3 shows a barcode scan engine in accordance with some embodiments.

FIG. 3 shows a barcode scan engine 55 in accordance with some embodiments. The barcode scan engine 55 includes the solid-state imager 62, the imaging lens assembly 60, the aiming lens assembly 80, the aiming light source 82, the illuminating lens assembly 70 positioned in front of the illumination source 72 (not shown in FIG. 3), and the controller 90 (not shown in FIG. 3). The solid-state imager 62, the aiming light source 82, the illumination source 72, and the controller 90 are all installed on the printed circuit board 91. In FIG. 3, the illuminating lens assembly 70 is also fastened on the printed circuit board 91. The imaging lens assembly 60 and the aiming lens assembly 80 can be fastened on a chassis (shown in the figures) or on the printed circuit board 91. All of these components are assembled and integrated together to form the barcode scan engine 55.

In FIG. 3, a target object (e.g., the barcode 40) in the filed of view (FOV) 65 can be imaged by the barcode scan engine 55. The aiming lens assembly 80 and the aiming light source 82 generate a visible aiming light pattern 85 towards the target object. In the implementation as shown in FIG. 3, the visible aiming light pattern 85 is in the form of an aiming cross. In other implementations, the visible aiming light pattern 85 can be in the form of other patterns, such as, in the form of an aiming spot, or in the form of a rectangular shaped aiming boundary. The barcode scan engine 55 can also generate an illumination pattern (not shown in the figure) that usually covers all areas of the filed of view (FOV) 65.

Figure 4A:
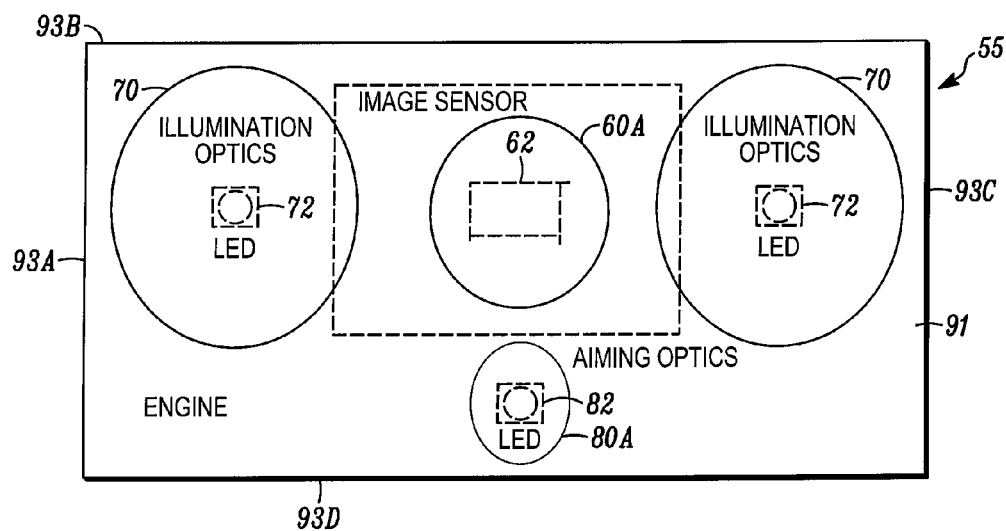
FIG. 4A is a top view of an existing implementation of the barcode scan engine.
Figure 4B:
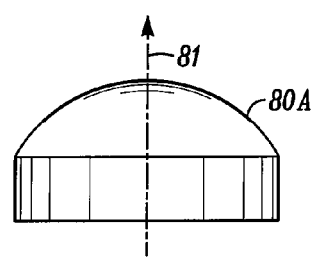
FIG. 4B shows the regular-shape lens in more details.

FIG. 4A is a top view of an existing implementation of the barcode scan engine 55. In FIG. 4A, the imaging lens assembly 60 includes an imaging lens 60A that is positioned atop of the solid-state imager 62. The aiming lens assembly, 80 includes a regular-shape lens 80A that is positioned atop of the aiming light source 82. The aiming light source 82 can be a light emitting diode. FIG. 4B shows the regular-shape lens 80A in more details. The regular-shape lens 80A is rotationally symmetric about an optical axis 81. As shown in FIG. 4A, the regular-shape lens 80A generally does not physically touch the imaging lens 60A when they are both assembled into the barcode scan engine 55. In FIG. 4A, the printed circuit board 91 includes four edges 93A, 93B, 93C, and 93D. In some implementations, one or more of these four edges is aligned with a wall of an enclosure. The size of the regular-shape lens 80A can be limited by the wall of the enclosure, because if the regular-shape lens 80A is too large, it may physically not fit in the space inbounded by the enclosure walls when it is assembled into the barcode scan engine 55.

Figure 5A:
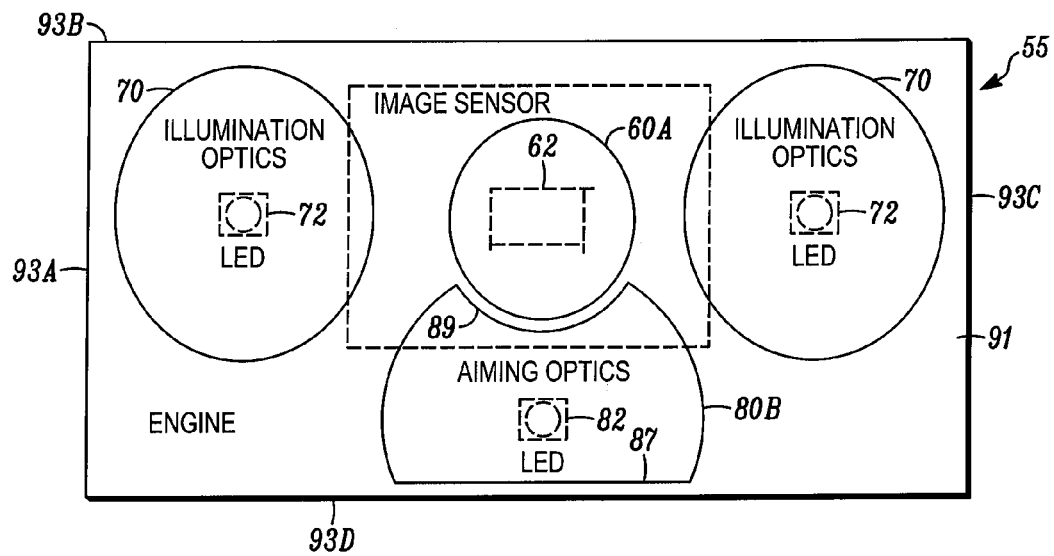
FIG. 5A is a top view of a barcode scan engine in accordance with some embodiments.

FIG. 5A is a top view of a barcode scan engine 55 in accordance with some embodiments. The barcode scan engine 55 in FIG. 5A provides some improvement over the barcode scan engine 55 in FIG. 4A. Particularly, the regular-shape lens 80A in FIG. 4A is replaced with an irregular-shape lens 80B. When a LED with a wide divergence angle is used as the aiming light source 82, the irregular-shape lens 80B in FIG. 5A enables more light from the LED source to be collected for generating the visible aiming light pattern 85, because the clear aperture of the irregular-shape lens 80B in FIG. 5A is significantly larger than that of regular-shape lens 80A in FIG. 4A. Consequently, the brightness of the visible aiming light pattern 85 generated by the aiming light source 82 can be significantly increased without increasing the size of the barcode scan engine 55.

Figure 5B:
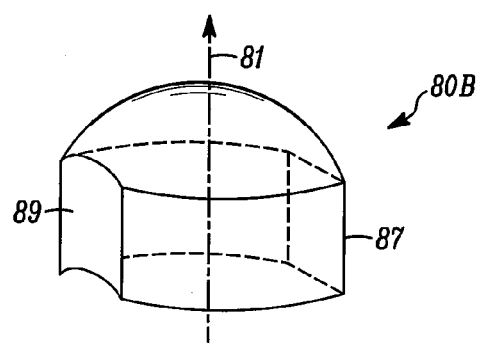
FIG. 5B shows the irregular-shape lens in more details

FIG. 5B shows the irregular-shape lens 80B in more details. The irregular-shape lens 80B includes a recess 89 for accommodating the imaging lens 60A when the irregular-shape lens 80B and the imaging lens 60A are both assembled into the barcode scan engine 55. The recess 89 can be formed by a concaved surface on the irregular-shape lens. The concavity on the irregular-shape lens 80B faces the imaging lens 60A when assembled.

In FIG. 4B, in accordance with some embodiments, the irregular-shape lens 80B can also includes a substantially flat surface 87 that is substantially parallel to an optical axis 81 of the irregular-shape lens 80B. In other embodiment, the flat surface 87 can be made to be substantially parallel to the chassis wall. In some implementations, the edge 93D of the printed circuit board 91 may be aligned with a wall of an enclosure. The flat surface 87 makes it possible for the regular-shape lens 80A to be assembled into such barcode scan engine 55 with flat walls. Similar to the flat surface 87, the irregular-shape lens 80B can be generally configured in other shape to enable it being able to be assembled into the barcode scan engine 55.

In one embodiment, the irregular-shape lens 80B can be manufactured from a regular-shape lens by making a recess 89 on the regular-shape lens for accommodating the imaging lens 60A when the irregular-shape lens 80B and the imaging lens 60A are both assembled into a barcode scan engine or a barcode reader. This recess 89 can be in the form a of a concavity facing the imaging lens 60A when assembled. In some embodiments, a portion of the regular-shape lens can also be removed to make a substantially flat surface 87 that is substantially parallel to an optical axis 81 of the regular-shape lens for accommodating a wall of an enclosure when the irregular-shape lens is assembled into a barcode scan engine or a barcode reader. In other embodiment, the substantially flat surface 87 can be made to be substantially parallel to the chassis wall.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus for using in a barcode reader comprising:
   an illumination source for providing illumination directed toward a target object;
   an imaging lens assembly including an imaging lens;
   a solid-state imager having an array of photosensitive elements positioned behind the imaging lens assembly for capturing an image from the target object;
   an aiming lens assembly including an irregular-shape lens;
   an aiming light source positioned behind the aiming lens assembly for generating a visible aiming light pattern towards the target object; and
   wherein the irregular-shape lens includes a recess for accommodating the imaging lens when the irregular-shaped lens and the imaging lens are both assembled into the apparatus.

2. The apparatus of claim 1, further comprising:
   a decoding circuitry operative to decode a barcode on the target object from the image captured by the solid-state imager.

3. The apparatus of claim 1, further comprising:
   an electric circuitry operative to transfer the image captured by the solid-state imager to a decoding circuitry of the barcode reader.

4. The apparatus of claim 1, wherein the recess of the irregular-shape lens is formed by a concaved surface on the irregular-shape lens.

5. The apparatus of claim 1, wherein the recess of the irregular-shape lens is of a concave shape on the irregular-shape lens.

6. The apparatus of claim 1, wherein the recess of the irregular-shape lens includes a concavity facing the imaging lens when the irregular-shaped lens and the imaging lens are both assembled into the apparatus.

7. The apparatus of claim 1, wherein the visible aiming light pattern projects generally in a direction along an optical axis of the irregular-shape lens, and the irregular-shape lens includes a substantially flat surface that is substantially parallel to said optical axis of the irregular-shape lens.

8. The apparatus of claim 1, wherein the irregular-shape lens is configured to accommodate the enclosure design when the apparatus is assembled.

9. The apparatus of claim 1, further comprising:
   an aperture located between the aiming lens assembly and the aiming light source for forming a predetermined aiming light pattern.

10. The apparatus of claim 1, further comprising:
    an aperture located between the aiming lens assembly and the aiming light source, wherein the aperture has one of a circular shape, a rectangular shape, and cross shape.

11. An apparatus for using in a barcode reader comprising:
    an illumination source for providing illumination directed toward a target object;
    an imaging lens assembly including an imaging lens;
    a solid-state imager having an array of photosensitive elements positioned behind the imaging lens assembly for capturing an image from the target object;
    an aiming lens assembly including an irregular-shape lens;
    an aiming light source positioned behind the aiming lens assembly for generating a visible aiming light pattern towards the target object; and
    wherein the irregular-shape lens is configured in a shape for increasing a clear aperture thereof and for accommodating at least one of (1) the imaging lens and (2) a wall of an enclosure when the apparatus is assembled, wherein the irregular-shape lens includes a recess for accommodating the imaging lens.

12. The apparatus of claim 11, wherein the irregular-shape lens is configured in a shape for accommodating both (1) the imaging lens and (2) a wall of an enclosure when the apparatus is assembled.

13. The apparatus of claim 11, further comprising:
    a decoding circuitry operative to decode a barcode on the target object from the image captured by the solid-state imager.

14. The apparatus of claim 11, further comprising:
    an electric circuitry operative to transfer the image captured by the solid-state imager to a decoding circuitry of the barcode reader.

15. An apparatus for using in a barcode reader, the barcode reader including an illumination source for providing illumination directed toward a target object, an imaging lens assembly including an imaging lens, and a solid-state imager having an array of photosensitive elements positioned behind the imaging lens assembly for capturing an image from the target object, the apparatus comprising:
    a irregular-shape lens including a recess for accommodating the imaging lens in the barcode reader when the irregular-shaped lens and the imaging lens are both assembled into the barcode reader; and
    wherein the irregular-shape lens is configured for using in an aiming lens assembly of the barcode reader to generate a visible aiming light pattern towards the target object with an aiming light source positioned behind the aiming lens assembly.

16. The apparatus of claim 15, wherein the visible aiming light pattern projects generally in a direction along an optical axis of the irregular-shape lens, and wherein the irregular-shape lens further comprises:
    a substantially flat surface that is substantially parallel to the optical axis of the irregular-shape lens.

17. The apparatus of claim 15, wherein the irregular-shape lens is configured for increasing a clear aperture thereof and for accommodating a wall of an enclosure when the apparatus is assembled.

18. A method of configuring a irregular-shape lens for using in an aiming lens assembly of a barcode reader to generate a visible aiming light pattern towards a target object with an aiming light source positioned behind the aiming lens assembly, the barcode reader including an illumination source for providing illumination directed toward the target object, an imaging lens assembly including an imaging lens, and a solid-state imager having an array of photosensitive elements positioned behind the imaging lens assembly for capturing an image from the target object, the method comprising the steps of:
    providing a regular-shape lens having an optical axis, the regular-shape lens being rotationally symmetric about the optical axis;
    constructing a recess on the regular-shape lens for accommodating the imaging lens of the barcode reader when the irregular-shaped lens and the imaging lens are both assembled into the barcode reader, wherein the step of making includes making a concavity facing the imaging lens.

19. The method of claim 18, further comprising:
    removing a portion the regular-shape lens for accommodating a wall of an enclosure of the barcode reader when the irregular-shape lens is assembled into the barcode reader.

20. The method of claim 18, further comprising:
removing a portion the regular-shape lens to make a substantially flat surface that is substantially parallel to the optical axis of the regular-shape lens for accommodating a wall of an enclosure of the barcode reader when the irregular-shape lens is assembled into the barcode reader.

* * * * *

UNITED STATES PATENT AND TRADEMARK OFFICE
CERTIFICATE OF CORRECTION

PATENT NO. : 8,342,410 B2
APPLICATION NO. : 12/787005
DATED : January 1, 2013
INVENTOR(S) : Chen et al.

Page 1 of 1

It is certified that error appears in the above-identified patent and that said Letters Patent is hereby corrected as shown below:

In the Specifications:

In Column 2, Line 28, delete "details" and insert -- details. --, therefor.

In Column 4, Line 30, delete "filed" and insert -- field --, therefor.

In Column 4, Line 41, delete "filed" and insert -- field --, therefor.

In Column 5, Line 35, delete "form a of a" and insert -- form of a --, therefor.

Signed and Sealed this
Fourth Day of June, 2013

Teresa Stanek Rea
*Acting Director of the United States Patent and Trademark Office*